Figure 5:
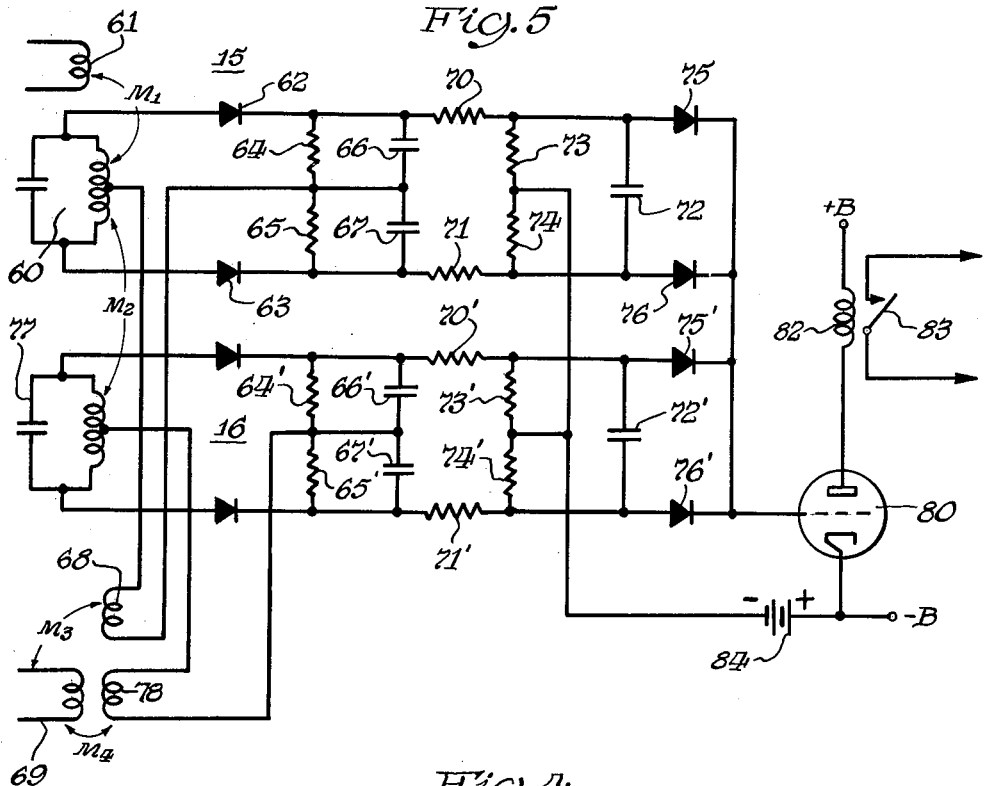

Nov. 26, 1963 — R. ADLER — 3,112,486
REMOTE CONTROL SYSTEM
Filed April 7, 1958 — 2 Sheets-Sheet 1
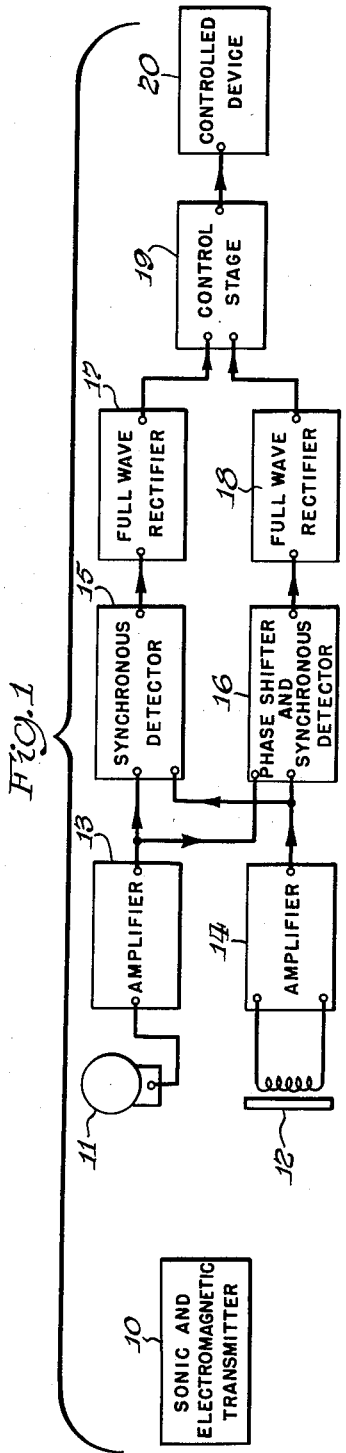
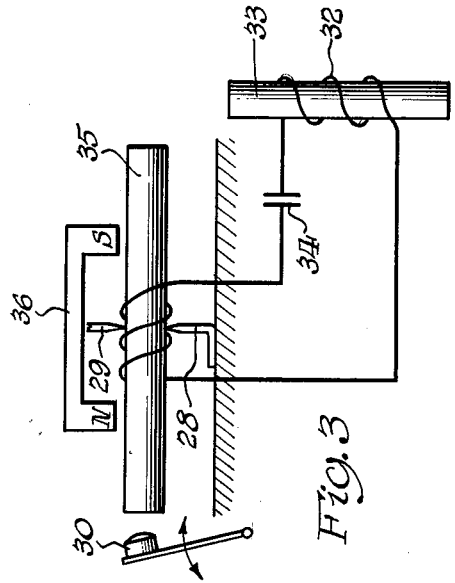
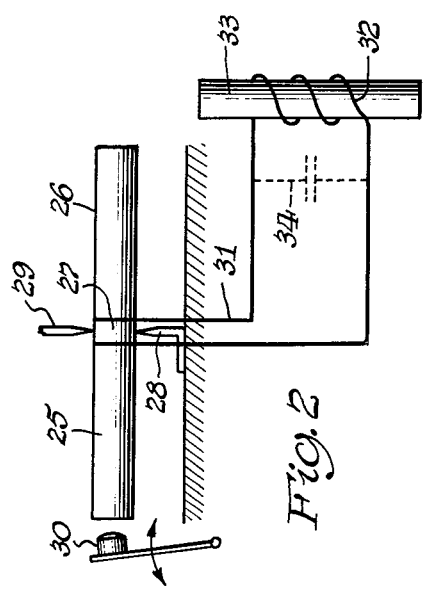
Inventor
Robert Adler
By Francis W. Crotty
Attorney Inventor
Robert Adler
By Francis W. Crotty
Attorney

United States Patent Office 3,112,486
Patented Nov. 26, 1963

3,112,486
REMOTE CONTROL SYSTEM
Robert Adler, Northfield, Ill., assignor to Zenith Radio Corporation, a corporation of Delaware
Filed Apr. 7, 1958, Ser. No. 726,688
14 Claims. (Cl. 343—225)

This invention relates to remote control systems in general and is particularly concerned with remote control arrangements that are relatively insensitive to false actuation.

While a variety of remote controls have been proposed those which feature the radiation of command signals from a controlling station to a satellite or controlled station have earned the greatest acceptance. They avoid obvious disadvantages attendant to the use of a connecting cable extending to the controlled station and are exceedingly flexible in operation. However, most such systems heretofore suggested have been subject to the inconvenience and disadvtange of false actuation attributable to spurious signals present in the area in which the controlled device is situated.

Efforts have been made to free the system from false actuation, with varying degrees of success. One arrangement that has proved very successful in the remote control of home instruments, such as radio and television receivers, is described and claimed in United States Letters Patent No. 2,817,025 issued on December 17, 1957 in the name of R. Adler and assigned to the same assignee as the present invention. In the disclosure of that patent, freedom from spurious operation results from the imposition of such requirements on the control signal that noise and other interference do not usually fall within the class of signals to which the controlled station responds. For example, the control signal must satisfy a frequency requirement by falling within a very narrow acceptance or frequency band of the controlled device and it must exceed a minimum pulse duration.

Another solution to the problem is the subject of a concurrently filed application, Serial No. 726,718, filed April 7, 1958 in the name of Alexander Ellett and likewise assigned to the same assignee as the present invention. This solution has certain common ground with the afore-identified patent in that command signals must satisfy two or more unique conditions before the slave station accepts and responds to them. Specifically, the slave responds only to the conjoint influence of two or more signals conveyed as separate radiations of at least two different types of signal energy. For example, and as expressly shown in the Ellett application, an acoustical signal plus an electromagnetic signal must be received with a certain relative timing in order to actuate the slave station. There is small likelihood that spurious radiations of both types of energy will occur in the neighborhood of the slave station and in such time relation as to effect a response so that freedom against false actuation is indeed very substantial. The present invention is directed to this same type of remote control and is a further development thereof, looking toward still greater freedom from inadvertent actuation attained with apparatus of practical and simplified construction.

Accordingly, it is an object of the present invention to provide a remote control system having increased recurity against false actuation even though it is dependent upon the radiation of control signals from a remote point to the controlled device.

It is another object of the invention to provide improved and simplified apparatus for use in the transmitting and receiving stations of such a remote control system.

A particular object of the invention is the provision of improved detectors for responding to received control signals and improved transmitters for radiating such signals to the controlled station.

A remote control system embodying the teachings of the present inventtion comprises means for radiating signal energy of a first type and of a given frequency as well as means for radiating signal energy of a second and different type but of the same frequency. Other means intercouple the two energy radiators so that one is energized by the other to effect concurrent radiation from both. A pair of receivers respond respectively to the first and second types of energy. The system includes a synchronous detector and means for applying signals from the pair of receivers to the detector. Means are coupled to the detector for deriving a control signal therefrom and other means apply that control signal to a utilizing device to the end that the device is controlled in accordance with the command of the received signals.

Figure 4:
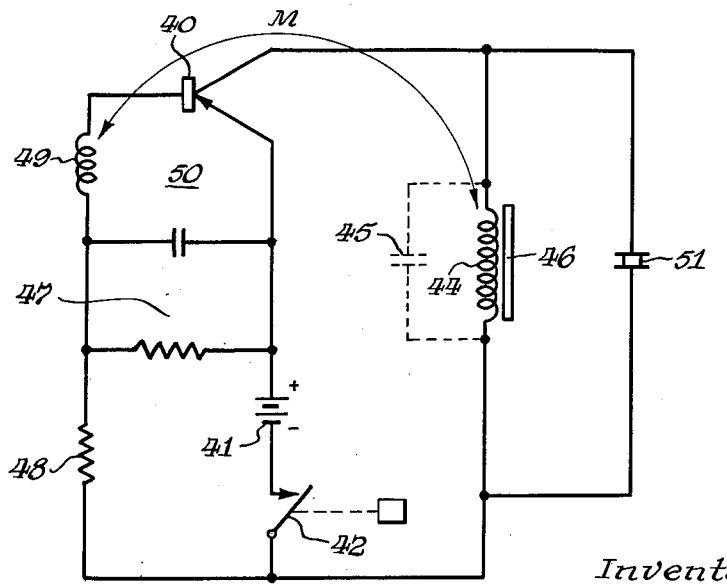

The features of the invention which are believed to be new are set forth with particularity in the appended claims. The invention, together with further objects and advantages thereof, may best be understood by reference to the following description taken in conjunction with the accompanying drawings in the several figures of which like components are designated by similar reference characters, and in which:

FIGURE 1 is a block diagram of a remote control system to which the invention has particular application;

FIGURES 2, 3 and 4 respectively represent different embodiments of transmitter apparatus constructed in accordance with the invention, and FIGURE 5 is a schematic circuit diagram of a detector system employing concepts of the invention.

Referring now more particularly to FIGURE 1, the arrangement there represented is a remote control system of general utility characterized by enhanced freedom from false actuation in response to spurious signals or interference which may effect a response in many remote control systems of the prior art. It is known from common experience that remote control systems of the general type under consideration find application to controlled devices useful in the home, such as radio and television receivers, phonographs and record-changing mechanisms as well as garage door openers. They are also particularly beneficial in a variety of industrial applications where it is desirable to initiate a controlled function from a remote point. Workhandling machines, furnaces and ovens, and such like lend themselves particularly well to controls of this type. For convenience of discussion, however, it will be assumed that the system of FIGURE 1 is employed to control a television receiver. The control exercised may be of the tuning or channel selection, volume level, on-off condition, and brightness or contrast. Several of these functions may be subjected to this type of control in a single system, but then it is necessary to employ a multiplicity of command signals to be received by the satellite station and channeled to effect particular control functions on the basis of the frequency of the received signal. A multiple-frequency remote control system responding to radiated control signals is disclosed and claimed in the above-identified Adler patent and the multiple-frequency techniques thereof are applicable to the system repersented schematically in FIGURE 1.

The departure of the subject invention from prior devices, including that of the aforesaid Adler patent, may be explained and most readily understood on the basis of a system designed to effect a single control function. Accordingly, the arrangement of FIGURE 1 will be assumed to be of the single-control type. Naturally, the advantages and apparatus embodiments of the invention to be described may be duplicated if a multiple-function system is desired. Returning now to a more particular consideration of FIGURE 1, the remote control system which it represents comprises a transmitter 10 having means for radiating signal energy of a first type and of a given frequency and also having other means for radiating signal energy of a second and different type but of the same frequency. More specifically, the transmitter will be considered to include a radiator of acoustic energy, a radiator of electromagnetic energy and means for intercoupling them to the end that one is energized by the other in order to effect concurrent radiation from both. Apparatus embodiments of such a transmitter will be considered in detail hereinafter. Where the system is arranged for control of home instruments, as with the case at hand, the transmitter will be portable and this is easily accomplished because the mechanism itself is of very small physical size.

A command signal in the form of concurrent radiation of signal components of acoustic and electromagnetic energy, issued by transmitter 10, is picked up by a pair of receivers 11, 12 respectively responsive to the two types of energy. Receiver 11 may conveniently take the form of a condenser-type microphone for accepting acoustical energy and receiver 12 may be a magnetic dipole comprising, structurally, a rod of ferrite material and a coil wound over the rod in known fashion. The receivers are coupled to amplifiers 13, 14 which may be tuned to the frequency of the transmitted energy. If the system contemplates the accomplishment of a single control function and therefore requires only one command represented by components of two different types of energy having a common frequency, these amplifiers may be highly selective to the frequency of that energy, taking advantage of the added security against inadvertent actuation afforded by the narrow bandwidth of a highly selective amplifier.

Since the signal components of two different types of energy are of the same frequency, the receiving system in accordance with the invention employs a synchronous detector. Such a detector 15 is connected to both amplifiers 13 and 14, the construction of the detector is one of the features of the subject invention to be considered in detail hereinafter. At this juncture, suffice it to say that an output signal is obtainable from the detector in the presence of both received signals but no output signal is available in the presence of either one alone. A synchronous detector is a phase-sensitive device developing a detection component which varies in both amplitude and polarity as the phase relation of a pair of applied signals of like frequency changes over 360 degrees. When the signals have a quadrature phase relation, the detector output is zero. It is not likely that such a phase relation would often be encountered, especially in the application of the control system to home-type instruments because any movement of the portable transmitter during its actuation produces a frequency change by virtue of the Doppler effect but, as a safeguard, the controlled station is provided with a second synchronous detector 16. This detector is likewise coupled to both amplifiers 13 and 14 and will be understood to include a phase-shifting network so that there is a phase shift of substantially 90 degrees between the signals applied to detectors 15 and 16 from one of the two amplifiers.

It is convenient and desirable to develop a D.C. output of the same polarity whenever either of the detectors concurrently receives two signals of like frequency and this is accomplished by a pair of full-wave rectifiers 17, 18 which are coupled to the detectors. These rectifiers have a common output circuit which is coupled to a control stage 19, in turn, coupled to the controlled device 20 which, for convenience will be assumed to comprise a motor-driven turret tuner of a television receiver.

In considering the operation of the system in changing the tuning of the television receiver, it will be assumed initially that the receiver is operating and that the controlled device 20, the motor-driven turret tuner, has been adjusted for the reception of a particular television broadcast available in the area in which the apparatus is located. It will also be assumed that it is desired to operate the turret and select another channel for reception. Transmitter 10 is actuated and radiates two signals which collectively constitute the necessary command to the controlled station. These signals are of identical frequency but one is acoustical and the other is electromagnetic. The sonic energy is intercepted by microphone 11, amplified in amplifier 13 and applied to detectors 15, 16. The electromagnetic energy, on the other hand, is intercepted by dipole 12, amplified in amplifier 14 and likewise supplied to detectors 15, 16. The concurrent application of these signals produces a D.C. output signal from one or both detectors and the rectification thereof in rectifiers 17, 18 assures that the resulting control potential applied to control stage 19 is of positive polarity. The presence of both radiations, which is required to establish an output from either detector, assures that the control potential applied to stage 19 is of sufficient amplitude to overcome an operating bias which normally establishes stage 19 in an inactive condition. The control stage actuates this stage to the end that a control pulse is applied to the motor-driven turret tuner 20, advancing it from the first tuning condition to another as described in Adler Patent 2,817,025.

One form of acoustical and electromagnetic transmitter suitable for use as unit 10 is represented in FIGURE 2. It comprises a cylindrically-shaped longitudinal-mode mechanical resonator or vibrator having a pair of passive vibrator elements 25, 26 and an interposed transducer 27 of the same diameter and in coaxial alignment with the passive elements. Elements 25, 26 may be sections of aluminum rod or other metal having an inherent low internal damping factor and their overall length is approximately equal to one-half the wavelength of sound in the material of the rods at the desired acoustic operating frequency. Transducer 27 may be constructed of a piezoelectric material, such as barium titanate, which has the property of transducing mechanical forces into electrical potentials. When employed in conjunction with a longitudinal-mode vibrator, as for the case under consideration, element 27 is a wafer having electrodes on opposite faces thereof and having a permanent or remanent polarization in a longitudinal direction. It is in such mechanical association with elements 25, 26 as by being soldered thereto that mechanical energy may be transferred from one of the elements 25, 26 through transducer 27 to the other element.

The longitudinal vibrator may be supported mechanically in the vicinity of its longitudinal center as indicated schematically at 28, 29. A suitable mechanical supporting arrangement is described and claimed in United States Letters Patent 2,821,956 issued February 4, 1958 to O. E. Wold and assigned to the same assignee as the present invention. It is preferred to have the vibrator supported at a nodal point which, if elements 25 and 26 are made of equal length, coincides with the center of transducer 27. Since elements 25, 26 are mechanically stronger than element 27, it may be convenient to make on of these two elements slightly longer than the other, thus placing the nodal point upon the longer element near the interface with transducer 27. The longitudinal vibrator may be actuated by a striker 30 which is mechanically supported to be struck against the free end of element 25. It is highly desirable that the mechanical triggering mechanism employed to actuate striker 30 be constructed to assure that a single triggering of the striker results in its impinging upon the vibrator only once and mechanism admirably suited for that purpose is the subject of United States Letters Patent 2,281,955 issued February 4, 1958 to R. C. Ehlers et al. and likewise assigned to the same assignee as the present invention. Since the details of the striker-actuating mechanism and the mechanical support for the longitudinal vibrator do not, per se, constitute essential parts of the subject invention, they have not been illustrated in detail. The patents referred to disclose the complete detail of structures suitable for use in the transmitter arrangement of FIGURE 2.

The longitudinal vibrator 25, 26 is a sonic radiator and leads 31, 31 extending from transducer 27 serve as means for deriving an electrical signal which may be utilized to energize an electromagnetic radiator. That radiator comprises a coil 32 wound about a rod 33 of ferrite material to serve as a magnetic dipole tuned by a condenser 34, shown in broken construction line, since it may be comprised, at least in part, of distributed capacitance in combination with the capacitance of transducer 27.

In operation, striker 30 is triggered and thrust against the free end of the longitudinal vibrator 25, 26. The vibrations thereof result in the radiation of sonic or acoustical energy at a frequency determined by the overall length of the vibrator. Its mechanical vibration is converted to an oscillatory potential which energizes magnetic dipole 32, 33 through the intercoupling afforded by leads 31, 31 extending between transducer 27 and the magnetic dipole. As a result, there is concurrent radiation of both acoustical and electromagnetic energy at the same frequency. The low internal damping of the longitudinal vibrator is adequate to assure that the different energy radiations, as received by pick-up device 11, 12, have a sufficient overlap or are sufficiently coextensive in time to serve the requirement of synchronous detectors 15 and 16 that signals of the same frequency be concurrently applied in order to derive a detected output signal. This is certainly the case for home installations wherein the separation of transmitter from controlled receiver is small enough that the difference of propagation velocities of sonic and electromagnetic energy in air is of no material consequence. For transmission over longer distances, it may be desirable, in effect, to delay the electromagnetic signal which has a higher propagation velocity. For example, a time-delay network may be interposed between dipole 12 and the input circuits of detectors 15, 16 coupled thereto. The oscillatory potential produced across transducer 27 may, under favorable conditions, be utilized directly in a receiver provided with an electrostatic antenna. In this case, additional elements 31—34 are not required, as the transmission and reception of elecrtical signal energy is accomplished through the alternating electrostatic field generated by the vibration of transducer 27.

The sonic-electromagnetic transmitter of FIGURE 3 differs from that of FIGURE 2 primarily in the mechanism by which the sonic radiator is coupled with and energizes the electromagnetic radiator. The sonic vibrator of FIGURE 3 is an elongated rod 35 of magnetostrictive material such as ferrite, nickel, or a nickel/iron alloy having strong magnetostrictive properties. Its length, in terms of frequency of the desired sonic radiation, is determined in generally the same way as the length of the longitudinal vibrator in the embodiment of FIGURE 2. The magnetostrictive rod 35 is subject to a magnetic biasing field which may be established by an electromagnet or by a permanent magnet, a permanent magnet 36 being represented for convenience only.

A magnetostrictive device has the property of converting mechanical stress waves to magnetic flux variations and vice versa, and the coupling through which the magnetostrictor energizes electromagnetic dipole 32, 33 comprises a pick-up coil or winding 37 wound about a portion of the magnetostrictor as a core. It is coupled through a tuning capacitance 34 to winding 32 of the electromagnetic dipole. This arrangement, when set into operation by the triggering of striker 30, effects concurrent radiation of acoustical and electromagnetic energy in generally the same way as described in the embodiment of FIGURE 2. The magnetostrictor, however, converts part of the mechanical energy of the sonic radiator into electromagnetic energy for the purpose of energizing the dipole 32, 33 through the coupling of pick-up coil 37. Vibration of magnetostrictive rod 35 produces an alternating magnetic flux in this rod. It is possible to utilize this alternating flux directly, without the aid of coil 32, dipole 33 and condenser 34, to produce an electromagnetic signal in an adjacent receiver. The addition of components 32, 33 and 34 results in substantially increased range.

FIGURE 4 represents a further transmitter embodiment in the form of a transistor oscillator. It includes a transistor 40 of the P–N–P type which receives forward biasing potentials from a battery 41. The circuit from the emitter to the collector electrode includes battery 41, a push-button actuated switch 42 and a resonant circuit comprising a coil 44 tuned by a capacitance 45 shown in broken line construction since it may be comprised in whole or in part of distributed capacitance. Coil 44 is wound about a ferrite rod 46 and constitutes therewith a magnetic dipole. The foward bias of the base relative to the emitter is derived from a potential divider including resistors 47 and 48. The base is connected to the emitter at signal frequency by means of a coil 49 and a condenser 50. Coil 49 is inductively coupled to coil 44 as designated by coupling symbol "M." As thus far described, the circuit is a transistor oscillator with feedback from the collector to the base electrode.

The sonic transmitter element of this arrangement is in the form of a piezoelectric transducer 51 which is a wafer of suitable material, such as barium titanate, having a permanent polarization in a longitudinal direction. The opposed faces of the wafer have electrode elements thereon through which the element is connected in parallel with resonant circuit 44, 45. During operating intervals in which push-button control switch 42 is closed, the circuit oscillates and transmits electromagnetic radiations via electromagnetic dipole 44, 46 and sonic oscillations by means of transducer 51. For proper operation, resonant circuit 44, 45 has a resonant frequency close to that of element 51, in which case the operating frequency is stabilized by the piezoelectric element. The acoustical and electromagnetic energies transmitted are of identical frequencies.

The preferred form of synchronous detector and full wave rectifier for utilization in the receiving end of the remote control system is shown in FIGURE 5. It includes a pair of detectors 15, 16 of generally similar circuitry. Detector 15 has a tuned input circuit 60 inductively coupled to coil 61, as represented symbolically at $M_1$. Coil 61 may be included in the output circuit of amplifier 13. Resonant circuit 60 is coupled in push-pull relation to a pair of diodes 62, 63 across which is coupled a load circuit provided by series-connected resistors 64, 65 and series-connected condensers 66, 67 in shunt relation to the resistors. A coupling coil 68, inductively coupled with a coil 69, as indicated by symbol $M_3$, provides means for applying a second signal to diodes 62, 63. One terminal of coil 68 connects to the midpoint of the coil of tuned circuit 60 while its other terminal connects to the common terminals of resistors 64, 65 and condensers 66, 67. The coil 69 is included in the output circuit of amplifier 14. The load circuit of diodes 62, 63 is coupled through series resistors 70, 71 to an integrating circuit having a relatively long time constant and constituted by a condenser 72 and a pair of series-connected resistors 73, 74. A full-wave rectifier comprising two additional diodes 75, 76 is connected across integrating circuit 72–74 to the end that the output signal from the described synchronous detector is always of the same polarity, namely, positive.

The companion circuit, including synchronous detector 16, is essentially the same as that just described except that the coupling from coil 61 to detector 16 is through an inductive coupling $M_2$ existing between tuned input circuit 60 of the first detector and tuned input circuit 77 of the second detector. This constitutes a phase-shifting network so that the signal injected by coil 61 has an in-phase relation as applied to detector 15 but a quadrature phase relation as applied to detector 16. The signal from coil 69, representing the second of the two signals supplied to the detectors, is applied through a coil 73 and in the same phase to both detectors. The load circuit, integrating circuit, and full-wave rectifier associated with synchronous detector 16 are the same as heretofore described in conjunction with detector 15 and have the same reference characters primed.

The full-wave rectifiers associated with both synchronous detectors 15, 16 share a common output circuit and are connected to the control electrode of an electron-discharge device 80 which may be included within the control stage 19 shown in block diagram in FIGURE 1. The anode of tube 80 is returned to a source of operating potential B+ through the energizing coil 82 of a relay having an armature 83 which may be closed upon energization of the relay to complete a circuit within controlled device 20. That circuit has not been shown in detail but is indicated as having contacts which may be closed by displacement of armature 83. Tube 80 is normally biased to anode current cut-off by means of a source 84 in the control electrode/cathode circuit and is rendered conductive during operating intervals in which an output signal, derived from detectors 15, 16 through the full-wave rectifiers, exceeds the cut-off bias.

During operating intervals in which a signal representing the acoustical energy is applied to detector 15 through coil 61 but in which no signal is concurrently applied to the same detector through coil 69, diodes 62, 63 operated in push-pull fashion so that there is no control potential developed by integrating condenser 72 in this balanced network. During any operating interval in which a signal representing the electromagnetic radiation only is applied through coil 69 to the diodes of detector 15, the diodes undergo similar symmetrical excursions and once again establish a no-signal condition on integrating condenser 72. The same is true of the other synchronous detector 16 when only one signal is received. Consequently, any time that one signal alone reaches the detectors, tube 80 remains cut off and the controlled device is uninfluenced by that signal.

During intervals when both coils 61 and 69 apply signals of equal frequency to detector 15, a potential is established across condenser 72 having an amplitude and polarity representing the relative phase of those signals. Its rectification in full-wave rectifier 75, 76 supplies a D.C. output of positive potential to render tube 80 conductive, energize relay winding 82, and actuate the controlled device. In the event that the two signals applied to detector 15 have a phase quadrature relation, this detector produces a zero output, but under that same condition, a 90-degree phase shift experienced in the application of a signal from coil 61 to detector 16 results in a desired signal output from that detector. Therefore, whenever both signals are received, an output potential of positive polarity is applied to tube 80. The diodes 75, 76 and 75¹, 76¹ pass to tube 80 the potential of the detector terminal which is most positive in any operating instant. If the potentials developed by integrating condenser 72, 72¹ are approximately equal, both detectors contribute to the potential applied to the control electrode of tube 80.

The long time-constant of integrating networks 72–74 and 72¹–74¹ enhances the freedom of the system from spurious operation. If two signals are received, having frequencies within the acceptance band of the detectors but differing slightly from one another, a low-frequency beat note is developed in the detector circuits and, unless suppressed, is rectified by the full-wave rectifiers for application to tube 80. The use of a long time-constant integrating network permits suppression of low-frequency beat notes to the end that the system operates only when signals of exactly the same frequency are received. More precisely, the choice of the time constant limits the maximum permissible frequency difference to a very small amount, thus excluding interfering signals while allowing for the Doppler effect caused by the unavoidable motion of a hand-held transmitter.

The described transmitter and detector arrangements employed in the remote control system of FIGURE 1 endow the system with material freedom from false actuation. The system is protected by the requirement of concurrently received signals of different types of energy in order to effect a response and has an additional and significant protection from the synchronous detector through which the controlled device may be caused to function only when signals of the necessary kinds of energy are received with exactly the same frequency. As already suggested, the use of a pair of synchronous detectors is a precaution against the remote contingency that the transmitted acoustical and electromagnetic signals may reach the controlled station in phase quadrature relation. This is a condition that will not be encountered frequently so that it is possible to have satisfactory performance through the use of a single synchronous detector. This is especially true for home intallations wherein the transmitter is so small and of such light weight that it may be conveniently carried in the hand. A slight displacement of the transmitter from a position giving rise to the phase quadrature relation of the transmitted signals changes that relation and establishes the necessary control potential to produce a response in the controlled device.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A remote control system comprising: means for radiating signal energy of a first type and of a given frequency; means for concurrently radiating signal energy of a second and different type but of the same frequency; a pair of receivers respectively responsive to said first and second types of energy; a synchronous detector; means for applying signals from said receivers to said detector; means coupled to said detector for deriving a control signal therefrom; a utilizing device; and means for applying said control signal to said utilizing device.

2. A remote control system comprising: means for radiating signal energy of a first type and of a given frequency; means for concurrently radiating signal energy of a second and different type but of the same frequency; a pair of receivers respectively responsive to said first and second types of energy; a pair of synchronous detectors; means for applying signals from said receivers to said detectors including a phase shifter for establishing a quadrature phase relation of one such signal as applied to said detectors; means coupled to said detectors for deriving a control signal therefrom; a utilizing device; and means for applying said control signal to said utilizing device.

3. A remote control system comprising: means for radiating signal energy of a first type and of a given frequency; means for concurrently radiating signal energy of a second and different type but of the same frequency; a pair of receivers respectively responsive to said first and second types of energy; a synchronous detector; means for applying signals from said receivers to said detector; a full-wave rectifier coupled to said detector for deriving a control signal therefrom; a utilizing device; and means for applying said control signal to said utilizing device.

4. A remote control system comprising: means for radiating acoustical energy of a given frequency; means for concurrently radiating electromagnetic energy of the same frequency; a pair of receivers respectively responsive to said acoustical and electromagnetic energy; a pair of synchronous detectors; means for applying signals from said receivers to said detectors including a phase shifter for establishing a quadrature phase relation of one such signal with respect to the other as applied to said detectors; a pair of full-wave rectifiers respectively coupled to said detectors and having a common output circuit for deriving a control signal therefrom; a utilizing device; and means for applying said control signal to said utilizing device.

5. In a remote control system for utilizing two radiated signals of the same frequency but of different types of energy; a pair of receivers respectively responsive to said different types of energy; a synchronous detector; means for applying signals from said receivers to said detector; a full-wave rectifier coupled to said detector for deriving a control signal therefrom; a utilizing device; and means for applying said control signal to said utilizing device.

6. In a remote control system for utilizing two radiated signals of the same frequency but of different types of energy; a pair of receivers respectively responsive to said different types of energy; a synchronous detector; means for applying signals from said receivers to said detector; an integrating network coupled to said detector to suppress low-frequency components in the detector output signal; a full-wave rectifier coupled to said integrating network for deriving a control signal therefrom; a utilizing device; and means for applying said control signal to said utilizing device.

7. In a remote control system for utilizing two radiated signals of the same frequency but of different types of energy, a pair of receivers respectively responsive to said different types of energy; a pair of synchronous detectors, means for applying signals from said receivers to said detectors including a phase shifter for establishing a quadrature phase relation of one such signal as applied to said detectors; means coupled to said detectors for deriving a control signal therefrom; a utilizing device; and means for applying said control signal to said utilizing device.

8. In a remote control system for utilizing two radiated signals of the same frequency but of different types of energy, a pair of receivers respectively responsive to said different types of energy; a pair of synchronous detectors; means for applying signals from said receivers to said detectors including a phase shifter for establishing a quadrature phase relation of one such signal as applied to said detectors; a pair of full-wave rectifiers respectively coupled to said detectors and having a common output circuit for deriving a control signal therefrom; a utilizing device; and means for applying said control signal to said utilizing device.

9. In a remote control system, first means for radiating signal energy of a first type and of a given frequency; second means including a transmitting antenna for radiating signal energy of a second and different type but of the same frequency; means, coupled between said first and second radiating means, for energizing said second radiating means in response to energization of said first radiating means to effect concurrent radiation from both; a utilizing device; and means conjointly responsive to both of the radiations for actuating said utilizing device only in the presence of both radiations.

10. In a remote control system, means for radiating signal energy of a first type and of a given frequency; means for converting signal energy of said first type into signal energy of a second and different type; means including a transmitting antenna for radiating said converted signal; a utilizing device; and means conjointly responsive to the radiations of said first and second types of signal energy for actuating said utilizing device only in the presence of both radiations.

11. In a remote control system, first means for radiating signal energy of a first type and of a given frequency; second means including a transmitting antenna for radiating signal energy of a second and different type but of the same frequency; means coupled to said first-radiating means for converting signal energy of said first type into signal energy of said second type and for applying said converted signal energy to said second radiating means as the energization therefor; a utilizing device; and means conjointly responsive to the radiations of said first and second types of signal energy for actuating said utilizing device only in the presence of both radiations.

12. In a remote control system, means including an electromechanical transducer for radiating acoustical energy of a given frequency; means including a transmitting antenna for radiating electromagnetic energy of the same frequency; means for deriving an electrical signal from said transducer and for utilizing said signal to energize said electromagnetic radiating means to effect concurrent radiation from both of said radiating means; a utilizing device; and means conjointly responsive to both of the radiations for actuating said utilizing device only in the presence of both radiations.

13. In a remote control system, an electromechanical transducer of the magnetostrictive type; means for mechanically actuating said transducer to effect radiation therefrom of acoustical energy of a given frequency; means including a transmitting antenna for radiating electromagnetic energy of the same frequency; means, including a pick-up coil coupled to said transducer for deriving an electrical signal from said transducer and for utilizing said signal to energize said electromagnetic radiating means to effect concurrent radiation from both of said radiating means; a utilizing device; and means conjointly responsive to both of the radiations for actuating said utilizing device only in the presence of both radiations.

14. In a remote control system, an electromechanical transducer comprising a pair of elongated passive vibrator elements and an interposed piezoelectric element in coaxial alignment and in energy transferring relation to said passive elements; means for mechanically actuating said transducer to effect radiation therefrom of acoustical energy of a given frequency; means including a transmitting antenna for radiating electromagnetic energy of the same frequency; means for deriving an electrical signal from said piezoelectric element and for utilizing said signal to energize said electromagnetic radiating means to effect concurrent radiations from both of said radiating means; a utilizing device; and means conjointly responsive to both of the radiations for actuating said utilizing device only in the presence of both radiations.

References Cited in the file of this patent

UNITED STATES PATENTS

| | | |
|---|---|---|
| 1,134,983 | Engler | Apr. 6, 1915 |
| 1,693,806 | Cady | Dec. 8, 1928 |
| 1,721,216 | Hardy et al. | July 16, 1929 |
| 1,732,741 | Conrad | Oct. 22, 1929 |
| 2,101,272 | Scott | Dec. 7, 1937 |
| 2,206,072 | Barthelemy | July 2, 1940 |
| 2,256,317 | Earp | Sept. 16, 1941 |
| 2,357,439 | Usselman | Sept. 5, 1944 |
| 2,571,019 | Donley et al. | Oct. 9, 1951 |
| 2,601,392 | Hammond | June 24, 1952 |
| 2,717,371 | Bruene | Sept. 6, 1955 |
| 2,930,955 | Bourget et al. | Mar. 29, 1960 |